United States Patent
Yu

(12) United States Patent (10) Patent No.: US 7,484,524 B1
Yu (45) Date of Patent: Feb. 3, 2009

(54) UPRIGHT WATER FAUCET

(75) Inventor: Hui-Lung Yu, Tangyou Li (TW)

(73) Assignee: Chang I Sanitary Co., Ltd., Tangyou Li (TW)

( * ) Notice: Subject to any disclaimer, the term of this patent is extended or adjusted under 35 U.S.C. 154(b) by 214 days.

(21) Appl. No.: 11/481,759

(22) Filed: Jul. 6, 2006

(51) Int. Cl.
*F16K 43/00* (2006.01)

(52) U.S. Cl. .................................. 137/315.12; 137/801

(58) Field of Classification Search ............ 137/315.21, 137/801, 315.12
See application file for complete search history.

(56) References Cited

U.S. PATENT DOCUMENTS 6,220,278 B1 * 4/2001 Sauter et al. ........... 137/315.12

7,296,588 B1 * 11/2007 Hwang ..................... 137/359

* cited by examiner

*Primary Examiner*—Kevin L Lee
(74) *Attorney, Agent, or Firm*—Alan Kamrath; Kamrath & Associates PA

(57) ABSTRACT

A water faucet includes a lower upright pipe integrally formed by a working process, and an upper upright pipe mounted on an upper portion of the lower upright pipe and formed by cutting a hollow pipe. Thus, the upper upright pipe is formed directly by cutting a hollow pipe, so that the upper upright pipe is made easily and rapidly, thereby decreasing the costs of fabrication, shortening the manufacturing time, simplifying the working process, and enhancing the working efficiency.

3 Claims, 9 Drawing Sheets

UPRIGHT WATER FAUCET

BACKGROUND OF THE INVENTION

1. Field of the Invention

The present invention relates to a water faucet and, more particularly, to an upright water faucet.

2. Description of the Related Art

A conventional water faucet in accordance with the prior art shown in FIG. 8 comprises a faucet body 10, and a water outlet pipe 100 connected to the faucet body 10. The faucet body 10 has an upper portion connected to a control valve (not shown) and a control handle (not shown) and a lower portion connected to a hot water pipe (not shown) and a cold water pipe (not shown). The upper portion of the faucet body 10 is formed with a receiving chamber 11 to receive the control valve, and the lower portion of the faucet body 10 is formed with a receiving chamber 12 to receive the hot water pipe and the cold water pipe. The faucet body 10 is made of a solid metallic bar which is turned and worked to form the receiving chambers 11 and 12 of the faucet body 10. The faucet body 10 has a mediate portion formed with two (hot and cold) water lines 13 connected to the hot water pipe and the cold water pipe and a water outlet line 14 connected to the water outlet pipe 100. The faucet body 10 has a side formed with a mounting recess 15 for mounting the water outlet pipe 100. The control valve has two water inlet holes (not shown) that are movable to align with the water lines 13 of the faucet body 10 and a water outlet hole (not shown) that is movable to align with the water outlet line 14 of the faucet body 10. Thus, the hot water from the hot water pipe and the cold water from the cold water pipe are supplied to and mixed in the control valve through the water lines 13 of the faucet body 10. Then, the mixed water in the control valve flows through the water outlet line 14 of the faucet body 10 into the water outlet pipe 100 for use with a user.

However, the faucet body 10 is made of a solid metallic bar, thereby increasing the costs of fabrication. In addition, the faucet body 10 is made of a solid metallic bar which is turned and worked to form the receiving chambers 11 and 12 of the faucet body 10, so that the faucet body 10 is not made easily and rapidly, thereby elongating the manufacturing time, complicating the working process, and decreasing the working efficiency.

Another conventional water faucet in accordance with the prior art shown in FIGS. 9 and 10 comprises a hollow faucet body 20, a dividing seat 21 mounted in the faucet body 20, and a water outlet pipe 200 connected to the faucet body 20. The faucet body 20 has an upper portion connected to a control valve and 22 and a control handle 23 and a lower portion connected to a hot water pipe (not shown) and a cold water pipe (not shown). The faucet body 20 has an inside formed with a receiving chamber 201 to receive the control valve 22, the control handle 23, the dividing seat 21, the hot water pipe and the cold water pipe. The faucet body 20 is made of a solid metallic bar which is turned and worked to form the receiving chambers 201 of the faucet body 20. The receiving chamber 201 of the faucet body 20 has a wall formed with two opposite limit grooves 202. The faucet body 20 has a side formed with a mounting recess 203 for mounting the water outlet pipe 200. The dividing seat 21 has an inside formed with two (hot and cold) water lines 212 connected to the hot water pipe and the cold water pipe and a water outlet line 213 connected to the water outlet pipe 200. The dividing seat 21 has a periphery formed with two opposite limit ribs 211 inserted into the limit grooves 202 of the faucet body 20. The control valve 22 has two water inlet holes (not shown) that are movable to align with the water lines 212 of the dividing seat 21 and a water outlet hole (not shown) that is movable to align with the water outlet line 213 of the dividing seat 21. Thus, the hot water from the hot water pipe and the cold water from the cold water pipe are supplied to and mixed in the control valve 22 through the water outlet line 213 of the dividing seat 21. Then, the mixed water in the control valve 22 flows through the water outlet line 213 of the dividing seat 21 into the water outlet pipe 200 for use with a user.

However, the faucet body 20 is made of a solid metallic bar, thereby increasing the costs of fabrication. In addition, the faucet body 20 is made of a solid metallic bar which is turned and worked to form the hollow receiving chamber 201, thereby producing much wasted material during the working process. Further, the faucet body 20 needs to have a wall thickness large enough to support the dividing seat 21, thereby elongating the manufacturing time and complicating the working process.

BRIEF SUMMARY OF THE INVENTION

The primary objective of the present invention is to provide a water faucet, wherein the upper upright pipe or the lower upright pipe is formed directly by cutting a hollow pipe, so that the upper upright pipe or the lower upright pipe is made easily and rapidly, thereby decreasing the costs of fabrication, shortening the manufacturing time, simplifying the working process, and enhancing the working efficiency.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
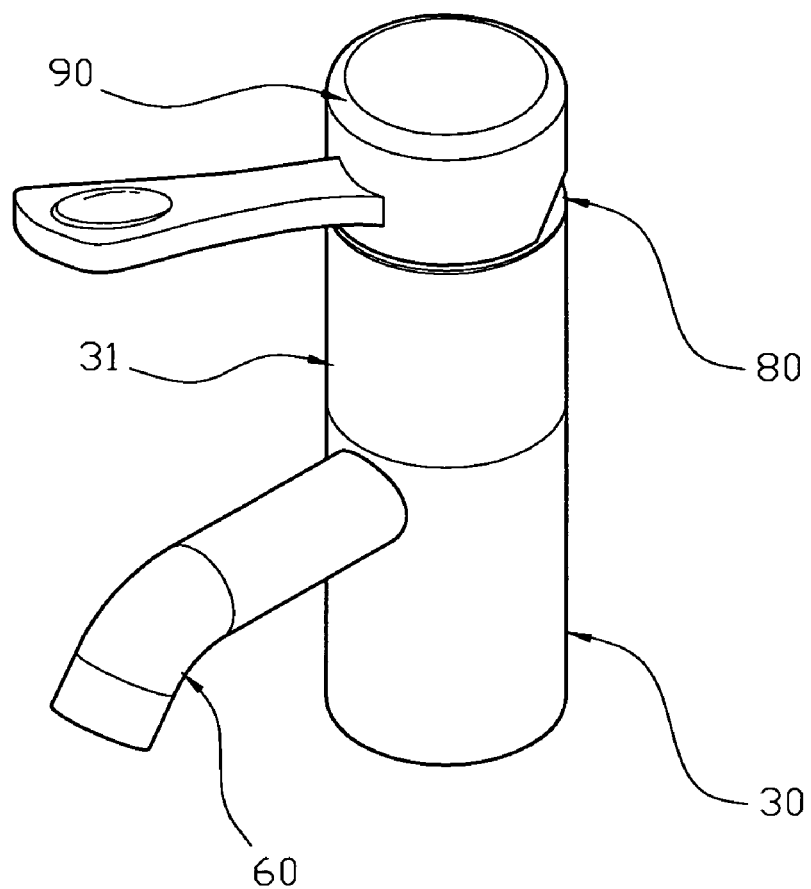
FIG. 1 is a perspective view of a water faucet in accordance with the preferred embodiment of the present invention.
Figure 2:
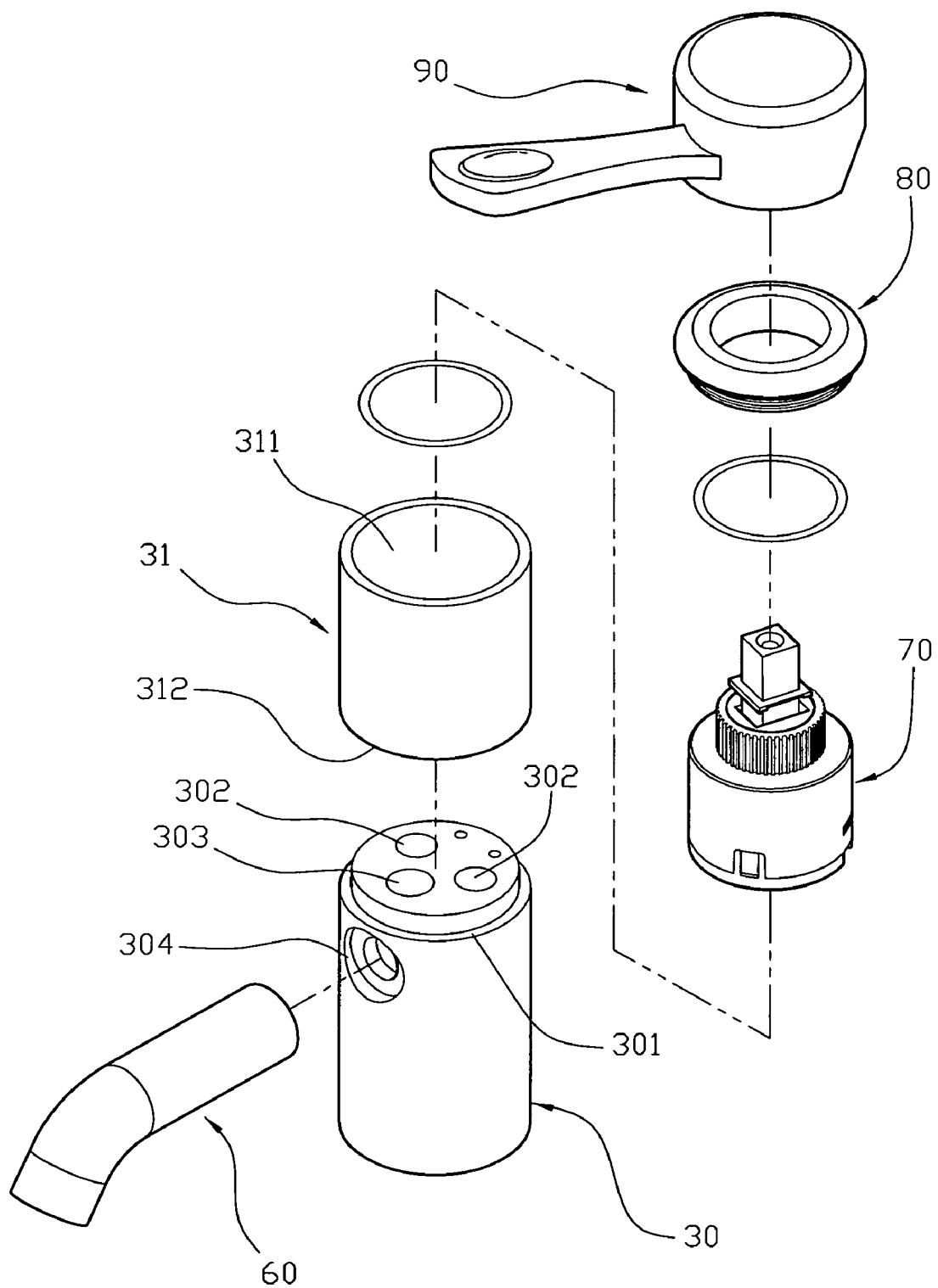
FIG. 2 is an exploded perspective view of the water faucet as shown in FIG. 1.
Figure 3:
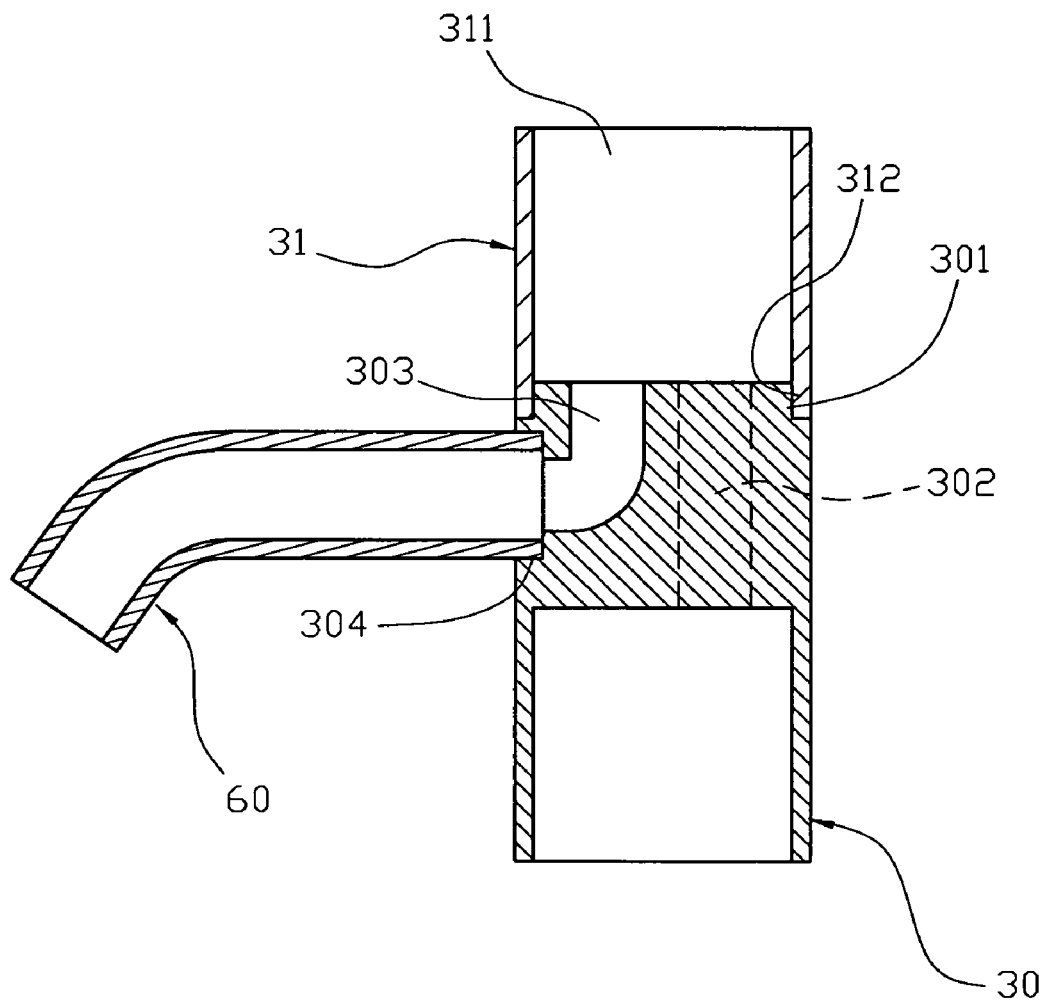
FIG. 3 is a partially plan cross-sectional view of the water faucet as shown in FIG. 1.

Referring to the drawings and initially to FIGS. 1-3, a water faucet in accordance with the preferred embodiment of the present invention comprises a lower upright pipe 30 integrally formed by a working process, and an upper upright pipe 31 mounted on an upper portion of the lower upright pipe 30 and formed by cutting a hollow pipe.

The water faucet further comprises a water outlet pipe 60 connected to the lower upright pipe 30, a control valve 70 rotatably mounted in the upper upright pipe 31 by a locking cap 80, and a control handle 90 mounted on the locking cap 80 and connected to the control valve 70 to control rotation of the control valve 70.

The upper portion of the lower upright pipe 30 has an inside formed with two (hot and cold) water lines 302 and a water outlet line 303 and a periphery formed with a mounting portion 301. The lower upright pipe 30 has a side formed with a mounting recess 304 for mounting the water outlet pipe 60 which is connected to the water outlet line 303 of the lower upright pipe 30.

The upper upright pipe 31 has an inside formed with a receiving chamber 311 to receive the control valve 70 and a lower end formed with a mounting section 312 mounted on the mounting portion 301 of the lower upright pipe 30.

The control valve 70 has two water inlet holes (not shown) that are movable to align with the water lines 302 of the lower upright pipe 30 and a water outlet hole (not shown) that is movable to align with the water outlet line 303 of the lower upright pipe 30.

Accordingly, the upper upright pipe 31 is formed directly by cutting a hollow pipe, so that the upper upright pipe 31 is made easily and rapidly, thereby decreasing the costs of fabrication, shortening the manufacturing time, simplifying the working process, and enhancing the working efficiency.

Figure 4:
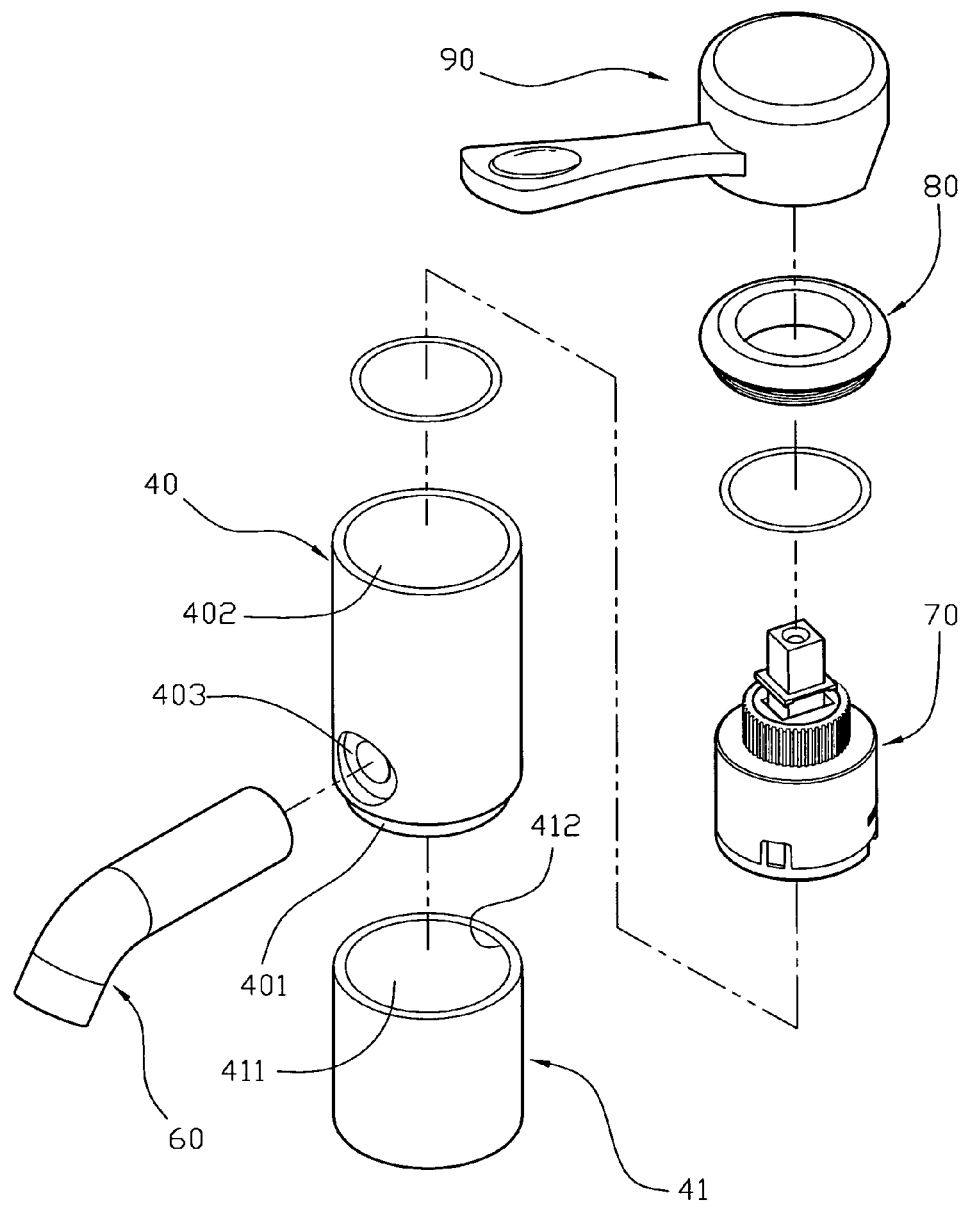
FIG. 4 is an exploded perspective view of a water faucet in accordance with another preferred embodiment of the present invention.
Figure 5:
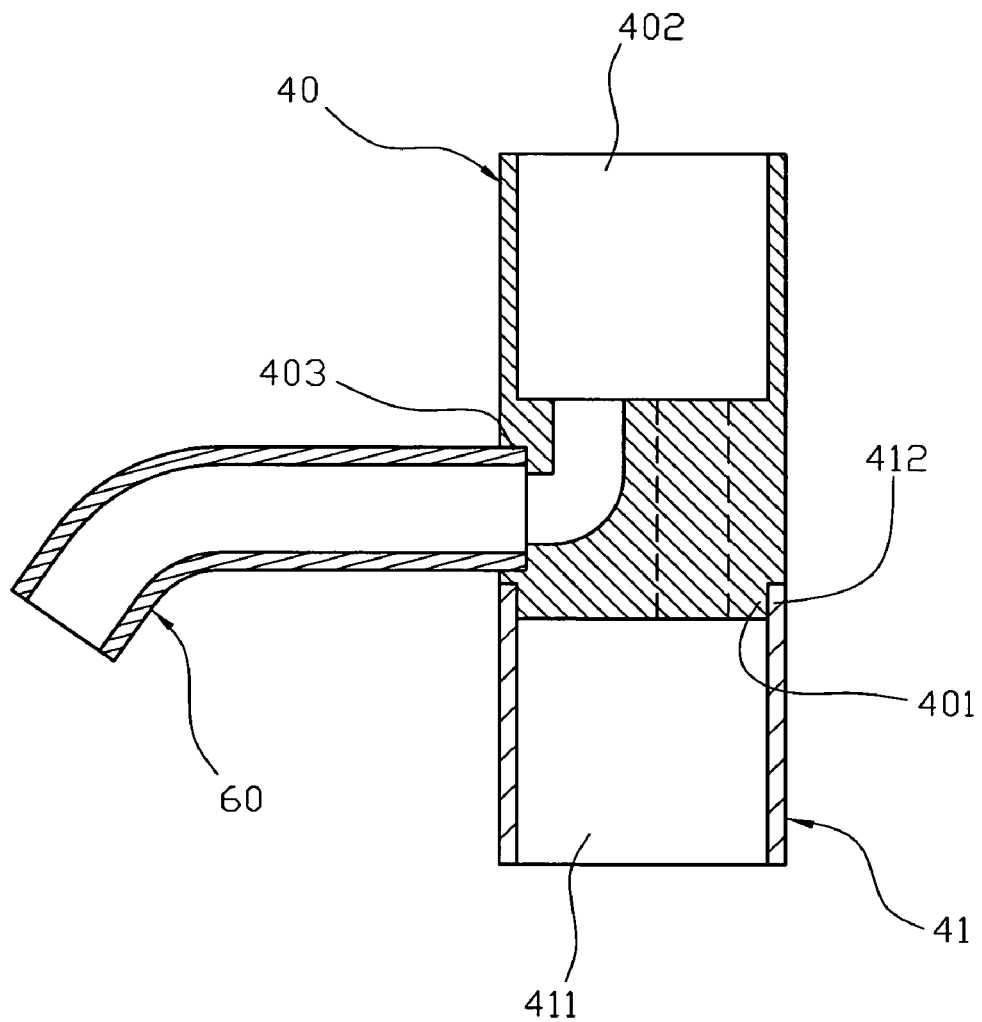
FIG. 5 is a partially plan cross-sectional assembly view of the water faucet as shown in FIG. 4.

Referring to FIGS. 4 and 5, a water faucet in accordance with another preferred embodiment of the present invention comprises an upper upright pipe 40 integrally formed by a working process, and a lower upright pipe 41 mounted on a lower portion of the upper upright pipe 40 and formed by cutting a hollow pipe.

The lower portion of the upper upright pipe 40 has an inside formed with two (hot and cold) water lines and a water outlet line and a periphery formed with a mounting portion 401. The upper upright pipe 40 has a side formed with a mounting recess 403 for mounting the water outlet pipe 60 which is connected to the water outlet line of the upper upright pipe 40. The upper upright pipe 40 has an upper end formed with a receiving chamber 402 to receive the control valve 70.

The lower upright pipe 41 has an inside formed with a receiving chamber 411 and an upper end formed with a mounting section 412 mounted on the mounting portion 401 of the upper upright pipe 40.

The control valve 70 has two water inlet holes (not shown) that are movable to align with the water lines of the upper upright pipe 40 and a water outlet hole (not shown) that is movable to align with the water outlet line of the upper upright pipe 40.

Accordingly, the lower upright pipe 41 is formed directly by cutting a hollow pipe, so that the lower upright pipe 41 is made easily and rapidly, thereby decreasing the costs of fabrication, shortening the manufacturing time, simplifying the working process, and enhancing the working efficiency.

Figure 6:
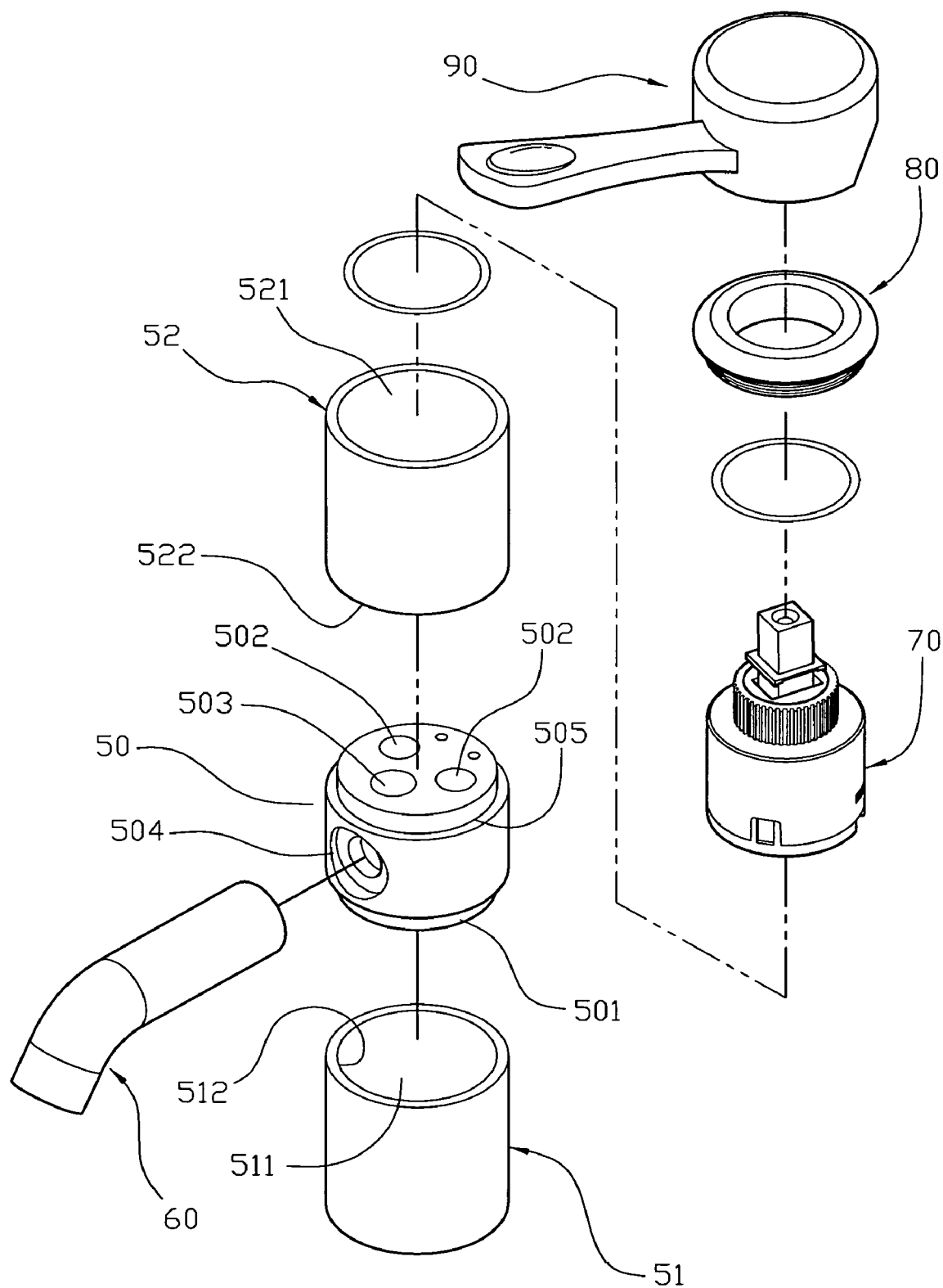
FIG. 6 is an exploded perspective view of a water faucet in accordance with another preferred embodiment of the present invention.
Figure 7:
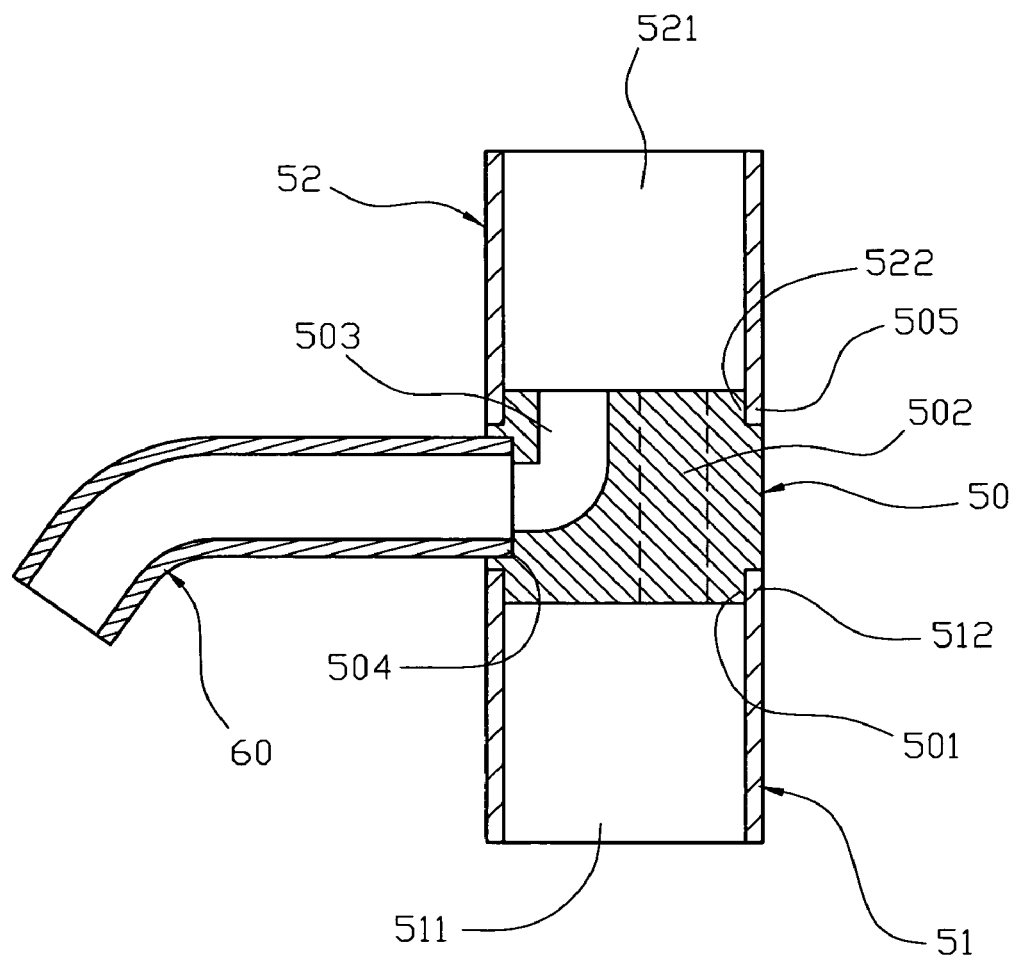
FIG. 7 is a partially plan cross-sectional assembly view of the water faucet as shown in FIG. 6.
Figure 10:
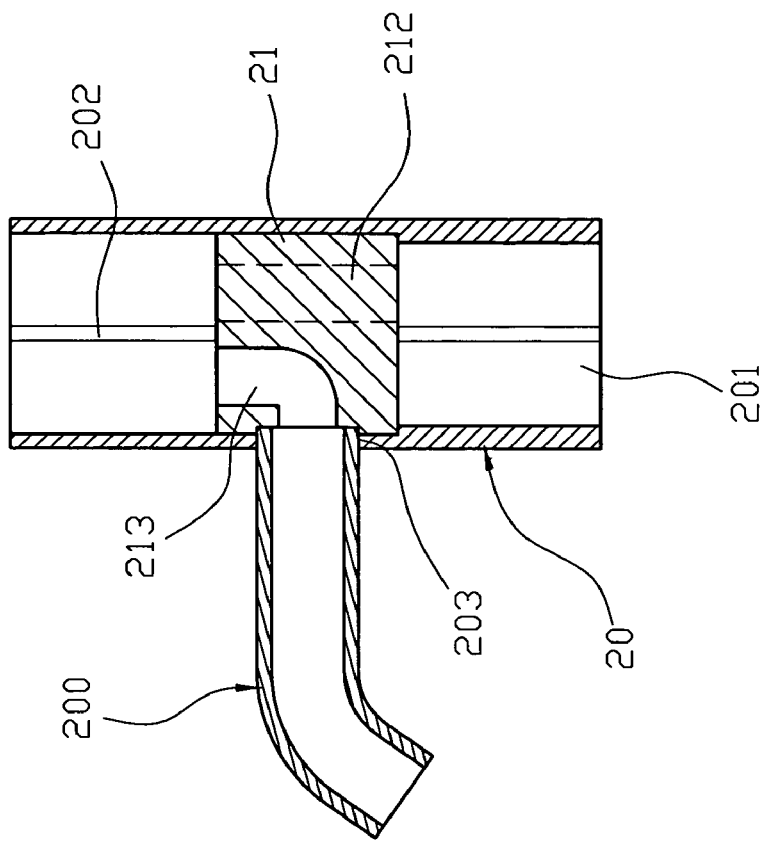
FIG. 10 is a partially plan cross-sectional assembly view of the conventional water faucet as shown in FIG. 9.
Figure 8:
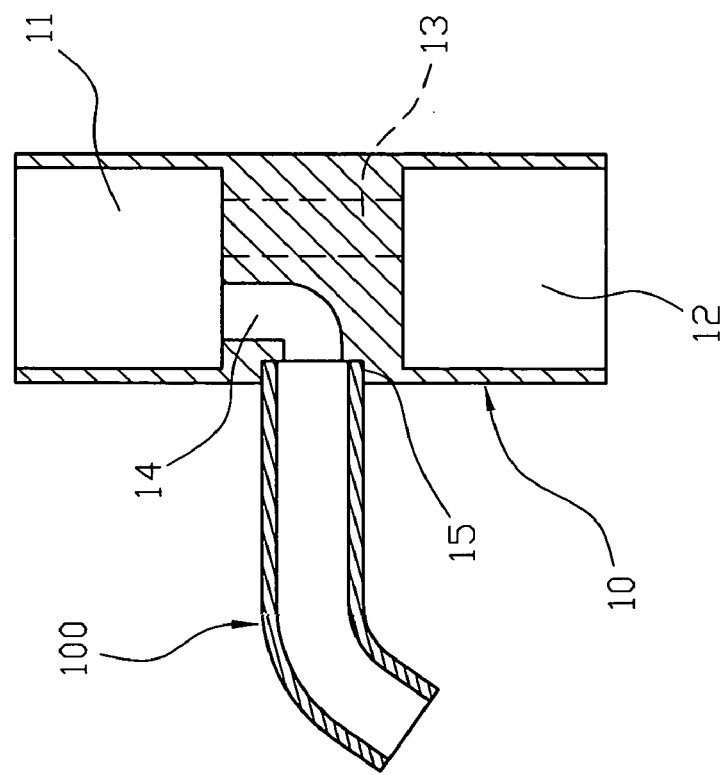
FIG. 8 is a partially plan cross-sectional view of a conventional water faucet in accordance with the prior art.
Figure 9:
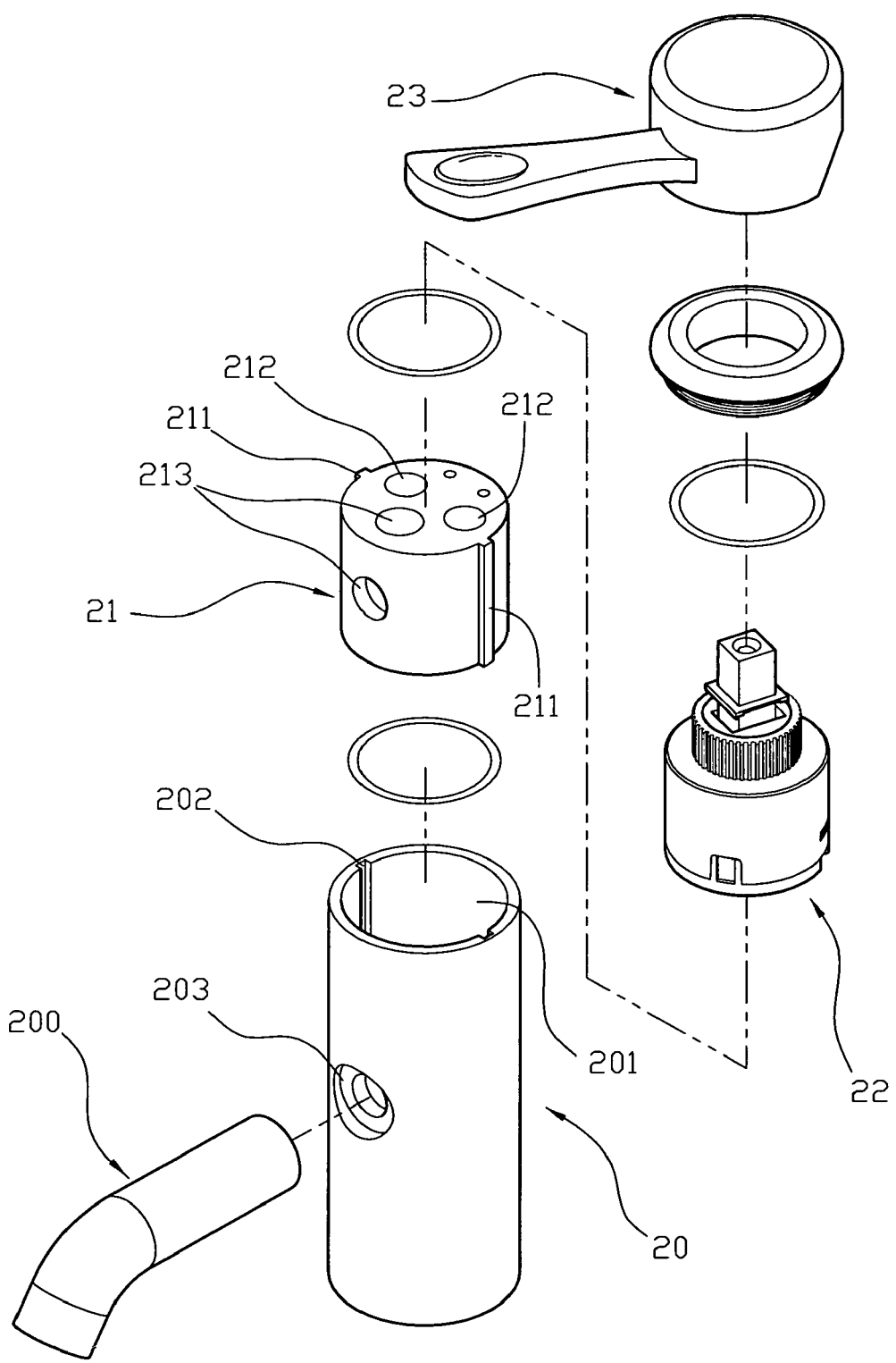
FIG. 9 is an exploded perspective view of another conventional water faucet in accordance with the prior art.

Referring to FIGS. 6 and 7, a water faucet in accordance with another preferred embodiment of the present invention comprises a connecting seat 50 integrally formed by a working process, an upper upright pipe 52 mounted on an upper portion of the connecting seat 50 and formed by cutting a hollow pipe, and a lower upright pipe 51 mounted on a lower portion of the connecting seat 50 and formed by cutting a hollow pipe.

The connecting seat 50 has an inside formed with two (hot and cold) water lines 502 and a water outlet line 503 and a side formed with a mounting recess 504 for mounting the water outlet pipe 60 which is connected to the water outlet line 503 of the connecting seat 50. The lower portion of the connecting seat 50 has a periphery formed with a lower mounting portion 501, and the upper portion of the connecting seat 50 has a periphery formed with an upper mounting portion 505.

The lower upright pipe 51 has an inside formed with a receiving chamber 511 and an upper end formed with a mounting section 512 mounted on the lower mounting portion 501 of the connecting seat 50.

The upper upright pipe 52 has an inside formed with a receiving chamber 521 to receive the control valve 70 and a lower end formed with a mounting section 522 mounted on the upper mounting portion 505 of the connecting seat 50.

The control valve 70 has two water inlet holes (not shown) that are movable to align with the water lines 502 of the connecting seat 50 and a water outlet hole (not shown) that is movable to align with the water outlet line 503 of the connecting seat 50.

Accordingly, the upper upright pipe 52 and the lower upright pipe 51 are formed directly by cutting a hollow pipe, so that the upper upright pipe 52 and the lower upright pipe 51 are made easily and rapidly, thereby decreasing the costs of fabrication, shortening the manufacturing time, simplifying the working process, and enhancing the working efficiency.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A water faucet, comprising:
    a lower upright pipe;
    an upper upright pipe mounted on an upper portion of the lower upright pipe;
    wherein the upper portion of the lower upright pipe has a periphery formed with a mounting portion, and the upper upright pipe has a lower end formed with a mounting section mounted on the mounting portion of the lower upright pipe;
    the upper portion of the lower upright pipe has an inside formed with two water lines and a water outlet line;
    the lower upright pipe has a side formed with a mounting recess;
    the upper upright pipe has an inside formed with a receiving chamber.

2. A water faucet, comprising:
    an upper upright pipe;
    a lower upright pipe mounted on a lower portion of the upper upright pipe;
    wherein the lower portion of the upper upright pipe has a periphery formed with a mounting portion, and the lower upright pipe has an upper end formed with a mounting section mounted on the mounting portion of the upper upright pipe;
    the lower portion of the upper upright pipe has an inside formed with two water lines and a water outlet line;
    the upper upright pipe has a side formed with a mounting recess;
    the upper upright pipe has an upper end formed with a receiving chamber;
    the lower upright pipe has an inside formed with a receiving chamber.

3. A water faucet, comprising:
    a connecting seat;
    an upper upright pipe mounted on an upper portion of the connecting seat and formed by cutting a hollow pipe;
    a lower upright pipe mounted on a lower portion of the connecting seat;

wherein the lower portion of the connecting seat has a periphery formed with a lower mounting portion, and the lower upright pipe has an upper end formed with a mounting section mounted on the lower mounting portion of the connecting seat;

the upper portion of the connecting seat has a periphery formed with an upper mounting portion, and the upper upright pipe has a lower end formed with a mounting section mounted on the upper mounting portion of the connecting seat;

the connecting seat has an inside formed with two water lines and a water outlet line;

the connecting seat has a side formed with a mounting recess;

the lower upright pipe has an inside formed with a receiving chamber;

the upper upright pipe has an inside formed with a receiving chamber.

* * * * *